May 25, 1965
R. L. FERRIS
3,185,421
FOLDABLE STANCHION
Filed Dec. 18, 1963
6 Sheets-Sheet 1
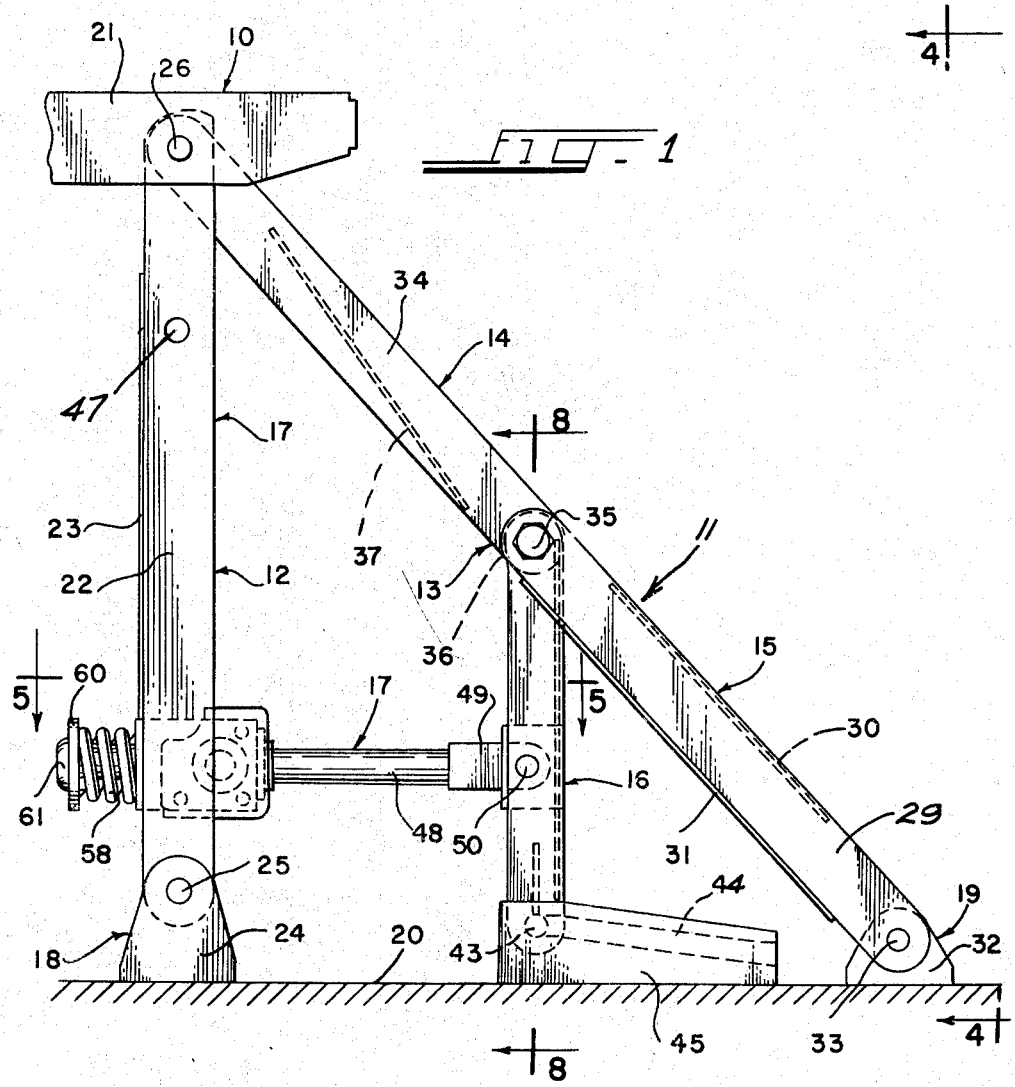
INVENTOR.
RAY L. FERRIS May 25, 1965  R. L. FERRIS  3,185,421
FOLDABLE STANCHION
Filed Dec. 18, 1963  6 Sheets-Sheet 2
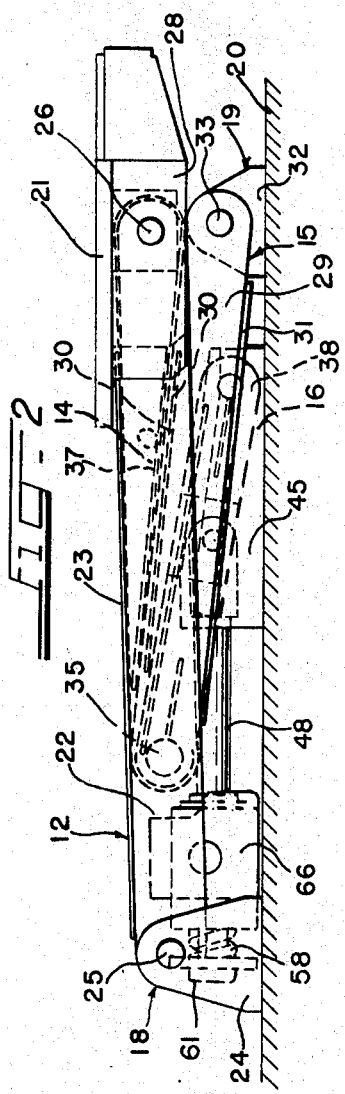
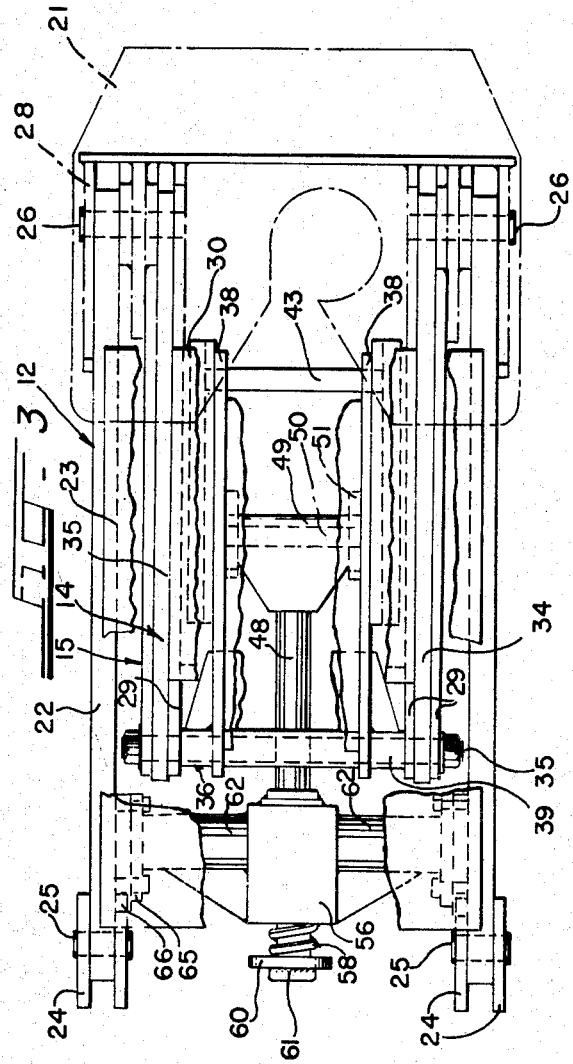
INVENTOR.
RAY L. FERRIS

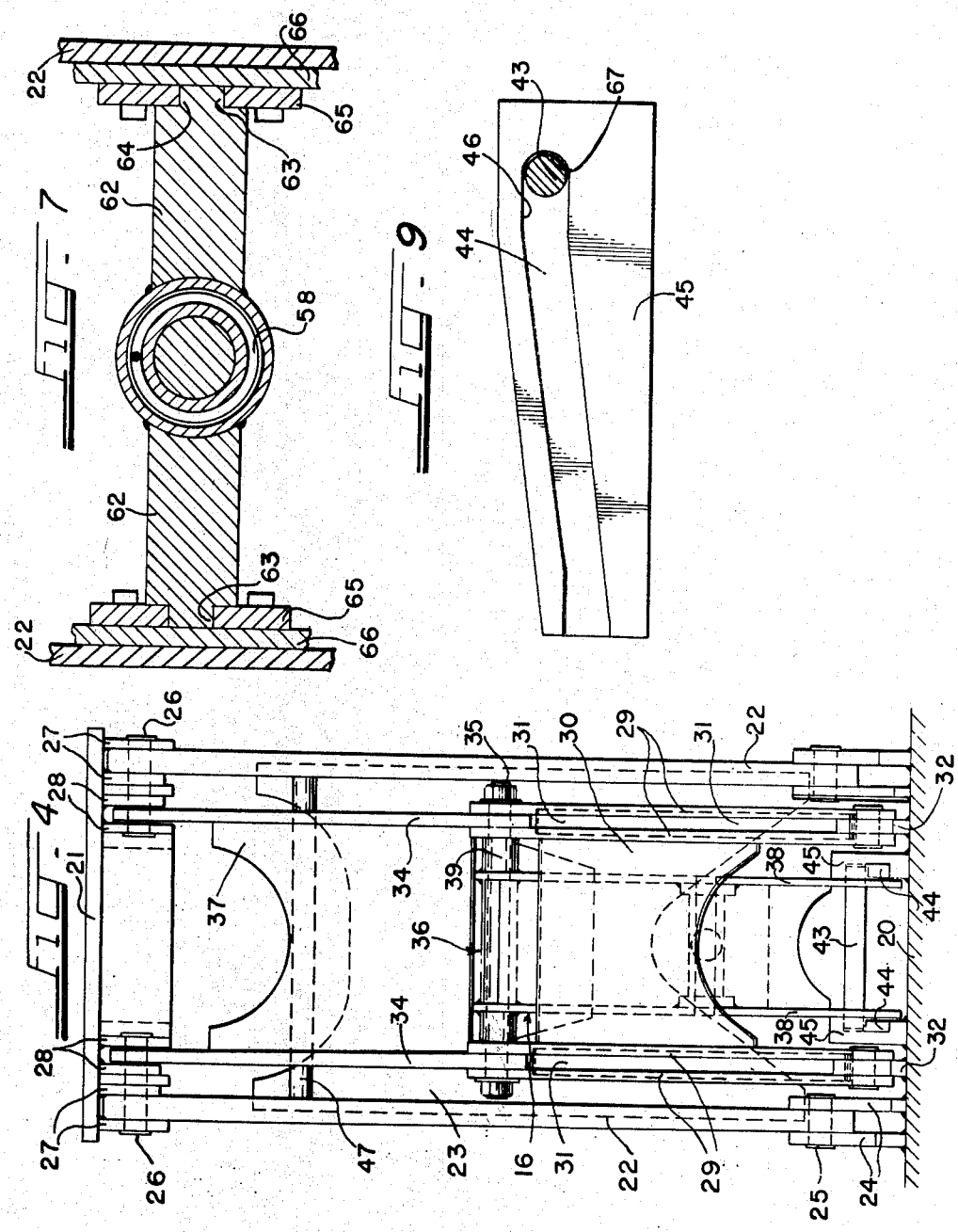

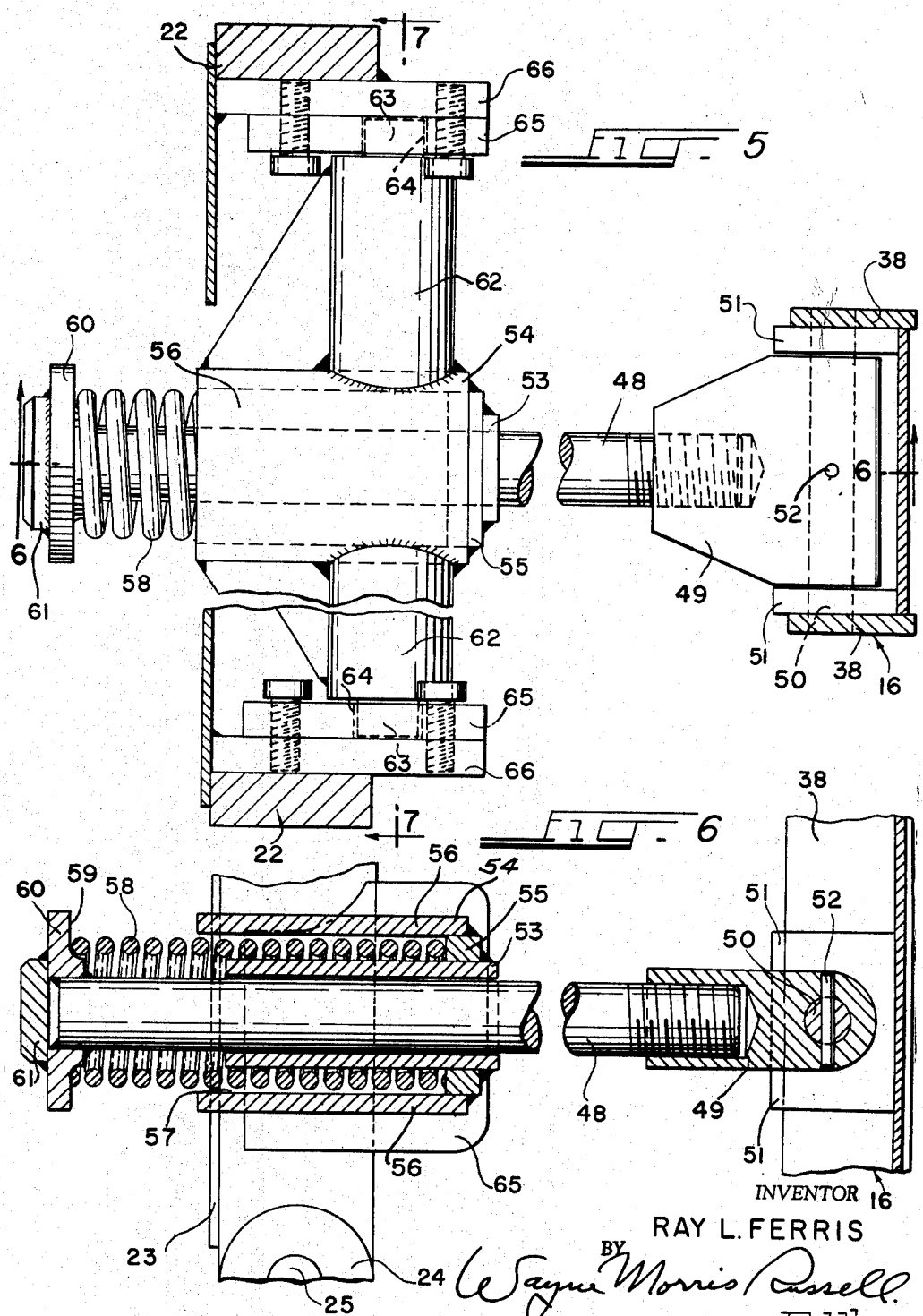

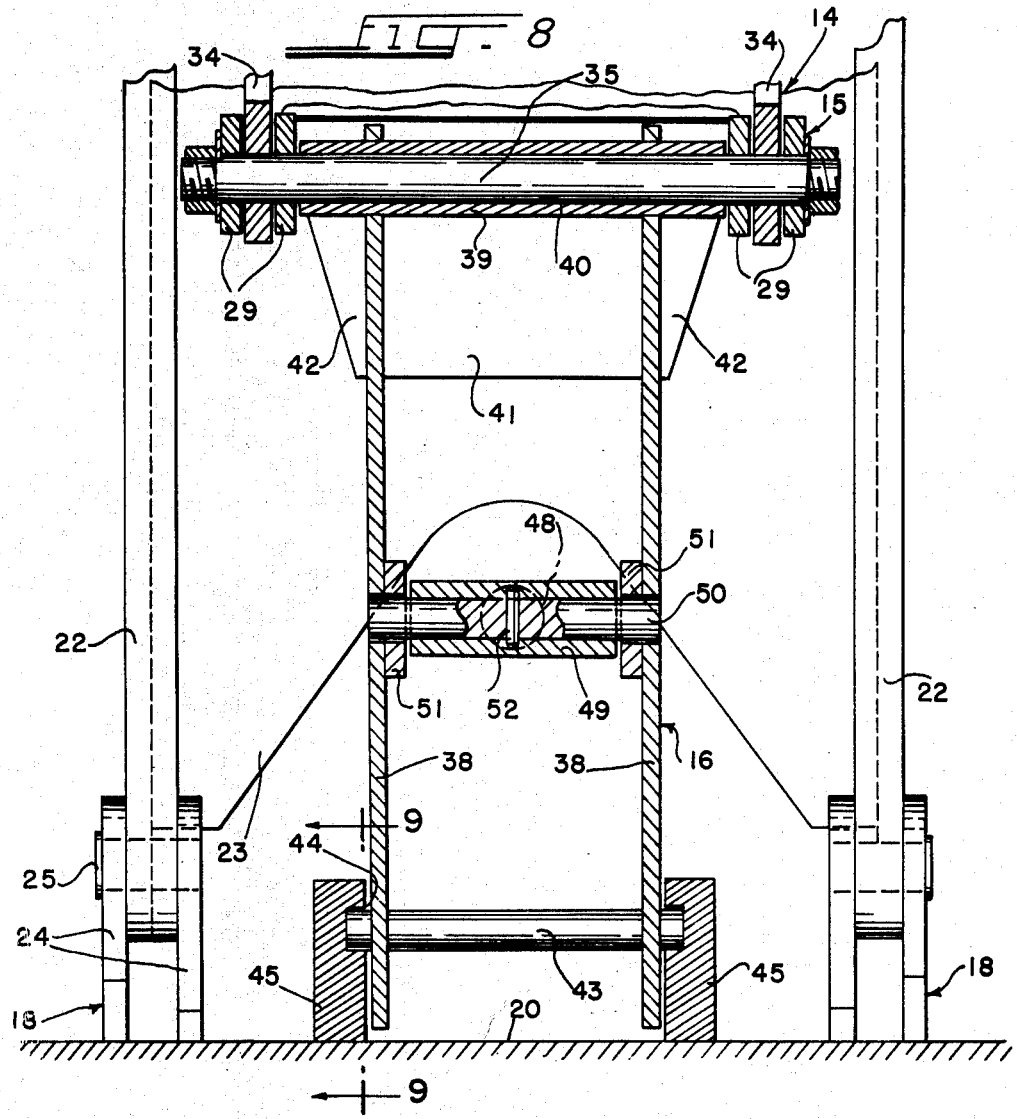

May 25, 1965
R. L. FERRIS
3,185,421
FOLDABLE STANCHION
Filed Dec. 18, 1963
6 Sheets-Sheet 6
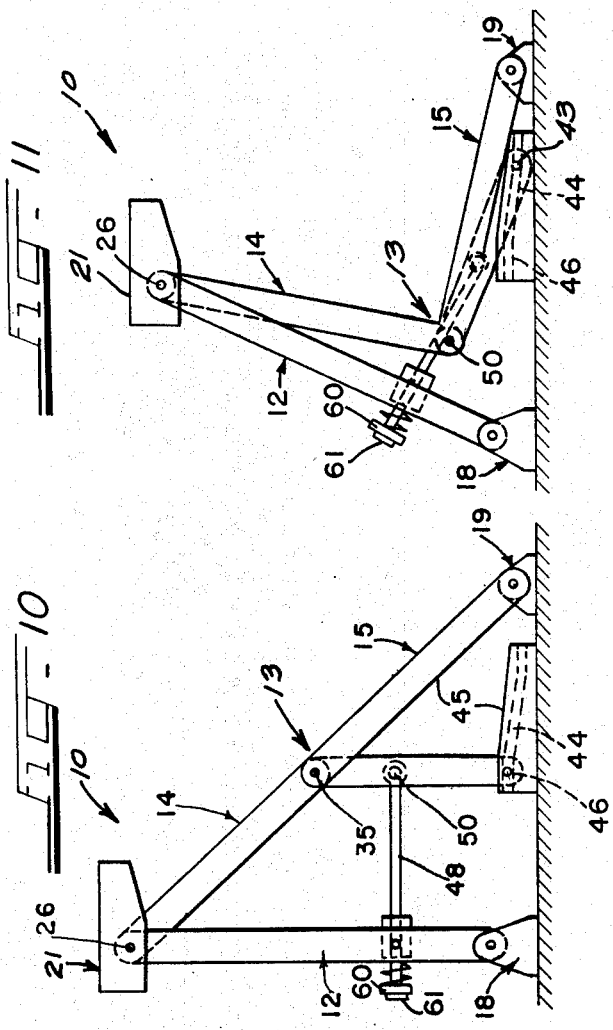
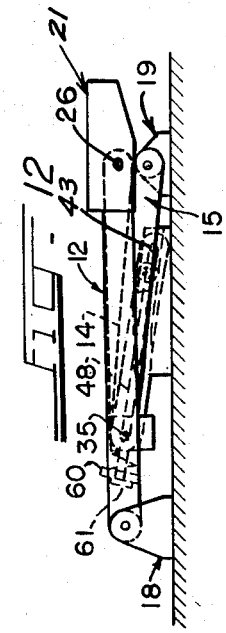
INVENTOR.
RAY L. FERRIS

United States Patent Office 3,185,421
Patented May 25, 1965

3,185,421
FOLDABLE STANCHION
Ray L. Ferris, Thornton, Ill., assignor to Pullman Incorporated, Chicago, Ill., a corporation of Delaware
Filed Dec. 18, 1963, Ser. No. 331,569
9 Claims. (Cl. 248—119)

The present invention relates to stanchions of the type employed in hitching a trailer on a flat car, and more particularly, to a trailer hitching stanchion which is movable between an erect semi-trailer hitching position and a collapsed position adjacent the railway car floor on which the stanchion is adapted to be mounted.

It is a principal object of the present invention to provide a trailer stanchion for positioning semi-trailers on a railway flat car which is constructed and arranged so as to occupy a minimum length of the railway car and to form a flat compact unit when the stanchion is lowered from the erect operative position to the collapsed position.

It is another object to provide a stanchion having vertical and diagonal struts which are pivotal about fixed pivots so as to be movable from a collapsed position to form a substantially right triangular support in an erect trailer supporting position.

It is still another object to provide a stanchion having vertical and diagonal struts which are pivotal about fixed base pivots so as to form a substantially right triangular support in the erect operative position which supports a fifth wheel plate at the apex thereof and wherein the diagonal strut includes foldable members pivotally connected intermediate the fixed pivot and a pivotal connection with the fifth wheel plate.

It is still another object to provide a collapsible stanchion including a vertical strut and a foldable diagonal strut which are constructed and arranged to be pivotal about fixed base pivots to form a substantially right triangular support in the erect operative position and wherein there is provided a slideable and pivotal intermediate vertical strut which coacts with said foldable diagonal strut for retaining the latter in a substantially rigid linear relationship in the erect operative position of said stanchion.

It is still another object to provide a collapsible stanchion including a vertical strut and a foldable diagonal strut which are constructed and arranged to be pivotal about fixed base pivots to form a substantially right triangular support in the erect operative position, and wherein there is provided a slidable and pivotal intermediate vertical strut which coacts with said diagonal strut for retaining the latter in a substantially rigid linear relationship in the erect operative position and there is operatively associated with the intermediate vertical diagonal strut a releasable resiliently urged latching arrangement which serves to hold the intermediate vertical strut in the position maintaining the stanchion in its erect position.

It is a further object taken in conjunction with the immediately foregoing object wherein the releasable resilient latching arrangement is constructed and arranged to also serve as a dampening means for reducing the shock of impact when the stanchion is lowered to its collapsed position on the base.

Other objects and features will hereinafter appear.

In the drawings:

FIG. 1 is a side elevational view of a stanchion embodying the structure of the present invention and showing the stanchion in its erect tractor support position;

FIG. 2 is a side elevational view of the stanchion illustrated in FIG. 1 but showing the stanchion in its collapsed position;

FIG. 3 is a top plan view of the stanchion in the collapsed position thereof with some of the parts broken away to show underlying details of structure;

FIG. 4 is an elevational view taken generally along the lines 4—4 of FIG. 1;

FIG. 5 is a fragmentary cross-sectional view taken generally along the lines 5—5 of FIG. 1 showing the releasable latching arrangement for holding the stanchion in the erect operative position shown in FIG. 1;

FIG. 6 is a cross-sectional view taken generally along the lines 6—6 of FIG. 5;

FIG. 7 is a cross-sectional view taken generally along the lines 7—7 of FIG. 5;

FIG. 8 is a cross-sectional view taken generally along the lines 8—8 of FIG. 1 showing in particular the slide block and intermediate vertical strut which is employed to maintain the foldable diagonal strut members in a rigid linear relationship in the erect operative position of the stanchion;

FIG. 9 is a cross-sectional view taken generally along the lines 9—9 of FIG. 8 showing in particular the slide block arrangement for guiding the lower end of the intermediate strut; and FIGS. 10, 11 and 12 are schematic illustrations of the stanchion in the operative erect position, an intermediate collapsed position and the collapsed position respectively.

Referring now to the drawings, in particular FIGS. 1–3, there is shown a stanchion 10 of the type which is employed on a railway car for hitching trailers thereon. The stanchion 10 comprises generally a fifth wheel support structure 11 including a vertical strut 12, a diagonal strut 13 formed from a pair of foldable members 14 and 15, an intermediate vertical or support strut 16, and a latching arrangement 17 for retaining the support structure 11 in an erect operative position. The vertical or upright strut 12 and diagonal strut 13 are pivotal about pivots 18 and 19 fixedly secured to a base 20 which may form part of the railway car or may be a base plate forming part of the stanchion support structure. Pivotally supported at the upper end of the vertical and diagonal struts 12 and 13 which form substantially an apex of the right triangular support is a fifth wheel plate assembly 21. The fifth wheel plate assembly 21 may be of more or less standard construction including the usual kingpin latching means (not shown) for receiving the kingpin depending from the underside of trailer.

As shown, the vertical strut includes a pair of laterally spaced legs 22 across which there is fixed a bracing plate 23. The lower ends of the legs are pivotally connected to the fixed pivots 18 including spaced pairs of trunnion brackets 24—24 and pivot pins 25. At the upper ends, the legs 22 are pivotally supported on the fifth wheel plate assembly 21 by means of pivot studs 26 which are mounted in pairs of spaced trunnion flanges 27—27 and 28—28.

The lower of the foldable diagonal strut members or lower diagonal strut 15 includes pairs of transversely spaced lower diagonal strut legs 29—29. Across the inner ones of the pair of legs 29 there is fixed a bracing plate 30. Fixed across each of the pairs of legs 29—29 is a plate 23. At the lower ends the pairs of legs 29—29 each embrace a trunnion bracket 32 of the fixed pivot 19 and are pivotally connected thereto by a pivot pin 33. At the other end, the pairs of legs 29—29 each receive therebetween the lower end of the respective ones of transversely spaced legs 34 of the upper diagonal strut 14.

Pivotally connecting the upper legs 34 and lower legs 29—29 is a pivot shaft 35 of a pivot assembly 36 of which the structure is more fully to be explained hereinafter. The upper ends of the legs 34 are respectively received within the pair of the downwardly depending flanges 28 and pivotally secured therein by means of the pivot stud 26. Suitably bracing the legs 34 is an upper brace plate 37. The upper and lower brace plates 30 and 37 are disposed so as not to interfere with the other components in the collapsed position of the stanchion as shown in FIGS. 2 and 3.

Disposed between the vertical strut 12 and the diagonal strut 13 is the intermediate vertical strut 16 which includes a pair of laterally spaced legs 38—38 which are of lesser lateral spacing than the legs 29—29 of the lower diagonal strut 15. The legs 38—38 are each connected at the upper ends thereof by a tubular shaft 39 through the bore 40 of which there extends the pivot shaft 35 which pivotally connects the upper and lower diagonal struts 14 and 15. The tubular shaft is suitably braced by means of a reinforcing plate 41 and gussets 42. At the lower end there extends through the legs 38 a transverse slide pin 43 of which the projecting ends are slidably and turnably received within the grooves 44—44 of slide blocks 45—45 fixed to the base 20.

As shown in particular in FIG. 9, the grooves 44 are formed on the inner walls of the slide blocks 45 and arranged to slope slightly upwardly in the direction of the vertical strut 12. The groove 44 terminates at its upper end in a substantially horizontal run 46.

As shown in FIG. 2 in the collapsed position of the stanchion 10 the upper diagonal strut 14 is folded over the lower diagonal strut 15. At the same time the intermediate vertical strut 16 is folded within the confines of the legs 29—29 of the lower diagonal strut 15 and the slide pin 43 at the lower end of the latter is positioned adjacent the open end of the grooves 44. Upon the application of a pulling force as by a cable attached to the lifting rod 47 fixed between the legs 22 of the vertical strut 12 the latter turns counter-clockwise as viewed in FIG. 2 from its overlying position. At the same time the upper diagonal strut 14 is unfolded from the position overlying the lower diagonal strut 15. Raising of the upper diagonal strut 14 also causes the pivot shaft 35 connecting the former to the lower diagonal strut 15 to be lifted. This causes the upper end of the intermediate vertical strut journaled thereon by way of the tubular shaft to be raised so that the slide pin 43 at the lower end thereof is drawn up the inclined groove 44 toward the horizontal run 46. When the vertical strut 12 is substantially perpendicular to the base 20 such that the upper and lower diagonal struts 14 and 15 are substantially in line, the slide pin 43 is disposed within the forward end of the horizontal run 46 and the intermediate vertical strut 16 is slightly tilted with respect to the perpendicular.

In order to urge the intermediate vertical strut 16 to the perpendicular position and to maintain the upper and lower diagonal struts in line such that a rigid triangular support is formed, there is provided a releasable latch or support rigidifying arrangement 17. As shown in FIGS. 5–7, the releasable support rigidifying assembly 17 is connected between the vertical strut 12 and the intermediate vertical strut 16 and includes a rod 48 to one end of which there is fastened as by threading a pivot block 49 through which there extends a pivot pin 50. The pivot pin 50 is turnably supported at its ends in spacer blocks and the intermediate vertical strut legs 38. The pivot block 49 is suitably keyed to the pivot pin 50 as by a dowel pin 52.

At its other end the rod 48 is journaled within an inner tubular spring guide 53 of a rockable mounted spring housing 54. The rockable spring housing includes the inner tubular spring guide 53 to one end of which there is fixed as by welding a spacer collar 55. Welded to the spacer collar 55 is one end of a tubular outer spring guide 56 which forms with the inner spring guide an annular chamber 57 which accommodates a compression spring 58. One end of the compression spring 58 engages the spacer collar 55 and the other end the shoulder 59 of an annular ring 60 fastened to the outer end of the rod 48. Fixed to the outer face of the ring 60 is a push button 61.

Fixed to the outer housing 53 in diametrically opposed relationship are pivot shafts 62 of which the outer ends of each are formed with reduced journal ends 63. The reduced journal ends 63 are turnably supported in opening 64 formed in pivot blocks 65 which are fastened to gussets 66 fixed as by welding to the inner faces of the vertical strut legs 22.

The compression spring 58 normally tends to urge the shaft outwardly of the spring housing 54 so that the intermediate vertical strut 16 tends to be drawn toward the closed end 67 of the slot 44. Thus when the stanchion 10 is substantially in its erect operative position wherein the slide pin 43 of the intermediate vertical strut 16 is in close proximity to the horizontal run 46 of the groove 44 the horizontal force exerted by the compression spring 58 on the rod 48 is such that the slide pin 43 is urged and held in engagement with the terminal end 67 of the groove. In this manner the intermediate vertical strut 16 is held perpendicular to the base 20 and thereby retains pivot shaft 35 whereby the upper and lower diagonal struts 14 and 15 are fixed in linear relationship. In this manner the upper and lower diagonal struts are maintained rigid relatively to each other and the stanchion is retained in the erect position.

To lower the stanchion 10 and to release it from the rigid erect position shown schematically in FIG. 10 the tractor which is employed to position and remove the trailer from the railway car is backed up so that the rear end of the chassis approaches the vertical strut and a member (not shown) fixed thereto engages in abutting relationship the button 61 on the end of the rod 48. Thus upon further backing of the tractor, the rod 48 is moved inwardly against the force of the compression spring. Inward movement of the rod 48 causes the lower end of the intermediate vertical strut 16 to swing counter-clockwise, as view in FIGS. 1 and 10, so that the slide pin 43 is forced out of the horizontal runs 46 of the slide block grooves 44. This pivotal movement of the intermediate vertical strut from the perpendicular position shown in FIG. 10 is permitted by way of the tubular shaft, the upper end of which shaft is turnably supported on the pivot shaft 35 connecting the upper and lower diagonal struts 14 and 15. When the slide pins 43 enter the inclined portion of the slide block grooves 44, the intermediate vertical strut 16 slides and turns to the left as view in FIG. 11 so that the upper and lower diagonal struts 14 and 15 fold about the pivot shaft 35.

During the collapsing of the stanchion 10 the compression spring 58 is further compressed so as to provide a force which resists the free falling movement of the stanchion. This resisting force provided by the compression spring 58 serves to prevent the sharp impact of the stanchion components on the base 20.

In the collapsed position as shown in FIG. 12, the rod 48 lies in a substantially horizontal position with the spring 58 compressed. Also the intermediate vertical strut is disposed at an incline within the inner ones of the legs 29 of the lower diagonal strut 15. The upper diagonal strut 14 is folded over the lower diagonal strut 15 and the portions of the legs 34 thereof which are adjacent to the pivot shaft 35 are nested in an inclined attitude within the respective ones of the pairs of legs 29—29 of the lower diagonal strut 15. Also, the vertical strut 12 assumes a substantially horizontal position and the legs 22 thereof nestingly overlie the respective ones of the legs 34 of the upper diagonal strut 14 projecting above the legs of the lower diagonal.

To elevate the stanchion 10 a cable or the like, which may be operated from a winch carried by the tractor (not shown), is attached to the lifting rod 47 and the cable is drawn upwardly. Under the force applied by the cable, the vertical strut 12 is turned counter-clockwise about the fixed pivot 18. At the same time the upper diagonal strut 14 is unfolded from its position overlying the lower diagonal strut and the pivot shaft 35 connecting the upper and lower diagonal struts is also raised. Raising of the pivot shaft causes the slide pin 43 fixed to the lower end of the intermediate diagonal strut to slide upwardly within the slide grooves 44.

When the stanchion 10 is elevated such that the slide pins 43 lie in the horizontal runs 46, the force of the compression spring is operative to more or less snap the slide pins 43 into engagement with the terminal ends 67 of the grooves. In this manner the intermediate vertical strut is moved to its perpendicular position such that the stanchion support structure 11 is retained erect in a substantially right triangular support.

What is claimed is:

1. A stanchion for supporting and hitching a trailer on a railway car having a base, said stanchion comprising first and second strut means positioned in triangular relation when in an erected operative position, a fifth wheel plate, said strut means pivotally supporting said fifth wheel plate, first pivot means connecting said first strut means to said base, said second strut including upper and lower strut members having adjacent ends, second pivot means connecting said adjacent ends whereby said strut members may be pivoted from a substantially linear operative position to a folded position, said upper strut member being pivotally connected relative to said first strut for movement therewith, third pivot means connecting said lower strut member to said base in longitudinal spaced relation relative to said first pivot means, and releasable latch means connected to said second strut to urge and maintain said strut members in said substantially linear operative position, said releasable latch means including longitudinally movable means responsive to a longitudinally applied force independent of said stanchion to cause said upper and lower strut members to be released from said operative position and pivot about said second and third pivot means so that said first strut means is moved about said first pivot means and said stanchion is collapsed.

2. A stanchion for use in hitching a trailer on a railway car comprising a base, an upright strut connected at one end of first pivot means fixed to said base for movement from a horizontal to an upright operative position, a diagonal strut connected relative to said upright strut and including an upper diagonal strut member and a lower diagonal strut member, pivot means connecting the adjacent ends of said upper and lower diagonal strut members whereby said upper and lower strut members are movable from a folded position to an operative substantially linear position, said lower diagonal strut member being connected to a second pivot means fixed to said base in lengthwise spaced relation to said first pivot means, a fifth wheel hitching and support plate assembly pivotally supported on said struts, supporting strut means pivotally supported at one end on said base and connected at the other end to said diagonal strut, latching means connected to said supporting strut means, and a lifting element on said stanchion adapted for connection to a source of power independent of said stanchion, whereby during lifting said struts are pivoted to said operative position and said latching means moves said supporting strut means in one direction into supporting relation relative to said diagonal strut members.

3. A stanchion for use in hitching and supporting a trailer on a railway car comprising a base, a first strut connected at one end to first pivot means fixed to said base for movement from a horizontal to an upright operative position, a second strut connected relative to said first strut and including an upper strut member and a lower strut member, second pivot means connecting the adjacent ends of said upper and lower strut members whereby said upper and lower strut members are movable from a folded position to an operative substantially linear position, said lower strut member being connected to a third pivot means fixed to said base in lengthwise spaced relation to said first pivot means, a fifth wheel hitching and support plate assembly pivotally supported on said struts, supporting strut means connected at one end to said second strut, and means on said base for supporting the other end of said supporting strut means between said first and third pivot means for movement from a collapsed position on said base to an erect substantially upright position so as to raise and lower said second pivot means and thereby to move said upper and lower strut members between said folded and operative positions, and lifting means on said stanchion separate from said supporting means adapted for connection to an extraneously applied lifting force for elevating said stanchion from said collapsed position.

4. A stanchion for use in hitching and supporting a trailer on a railway car comprising a base, a first strut connected at one end to first pivot means fixed to said base for movement from a horizontal to an upright operative position, a second strut connected relative to said first strut and including an upper strut member and a lower strut member, second pivot means connecting the adjacent ends of said upper and lower strut members whereby said upper and lower strut members are movable from a folded position to an operative substantially linear position, said lower strut member being connected to a third pivot means fixed to said base in lengthwise spaced relation to said first pivot means, a fifth wheel hitching and support plate assembly pivotally supported on said struts, supporting strut means connected at one end to said second strut, means on said base for supporting said other end of said supporting strut between said first and third pivot means for movement from a collapsed position on said base to an erect position so as to lower and raise said pivot means and thereby to move said upper and lower strut members between said folded and operative positions, and latching means on said stanchion including means biasing said supporting strut means into said erect position and thereby to releasably latch said upper and lower diagonal strut members in said operative substantially linear position.

5. The invention as defined in claim 4 wherein said latching means is connected at one end to said first strut and the other end to said supporting strut means.

6. A stanchion for use in hitching and supporting a trailer on a railway car comprising a base, a first strut connected at one end to first pivot means fixed to said base for movement from a horizontal to an upright operative position, a second strut connected relative to said first strut and including an upper member and a lower strut member, second pivot means connecting the adjacent ends of said upper and lower strut members whereby said upper and lower strut members are movable from a folded position to an operative substantially linear position, said lower strut member being connected to a third pivot means fixed to said base in lengthwise spaced relation to said first pivot means, a fifth wheel hitching and support plate assembly pivotally supported on said struts, supporting strut means connected at one end to said second strut, means on said base for supporting the other end of said supporting strut between said first and second pivot means for movement in one direction to an erect position so as to raise said second pivot means and thereby to move said upper and lower strut members to said operative position, and latching means including longitudinally movable biasing means biasing said support for movement in said one direction and into said erect position and thereby to releasably latch said upper and lower diagonal strut members in said operative substantially linear position.

7. The invention as defined in claim 6 wherein said latching means includes impact responsive means adapted to be engaged by an externally applied impact to move said biasing means in the other direction and thereby move said supporting strut in said other direction and into said collapsed position whereby said upper and lower struts are released and movable to said folded position.

8. The invention as defined in claim 7 wherein said latching means includes a rod pivotally connected at one end to said supporting strut, a housing turnably fastened to said first strut and slidably supporting said rod, said other end of said rod extending outwardly of said housing, button means fixed to the other end of said rod for receiving said impact, and spring means disposed between said button means and said housing.

9. A stanchion for use in hitching and supporting a trailer on a railway car comprising a base, a first strut connected at one end to first pivot means fixed to said base for movement from a horizontal to an upright operative position, a second strut connected relative to said upright strut and including an upper strut member and a lower strut member, pivot means connecting the adjacent ends of said upper and lower strut members whereby said upper and lower strut members are movable from a folded position to an operative substantially linear position, said lower diagonal strut member being connected to a second pivot means fixed to said base in lengthwise spaced relation to said first pivot means, a fifth wheel hitching and support plate assembly pivotally supported on said struts, supporting strut means connected at one end to said pivot connecting said adjacent ends of said strut members, means on said base for slidably and turnably supporting said other end of said supporting strut between said first and second pivot means so as to raise and lower said pivot means and thereby to move said upper and lower strut members between said folded and operative positions.

References Cited by the Examiner

UNITED STATES PATENTS

| | | | |
|---|---|---|---|
| 2,835,209 | 5/58 | Kavanaugh | 105—386 |
| 3,041,028 | 6/62 | McDowell | 248—119 |

CLAUDE A. LE ROY, *Primary Examiner.*

FRANK L. ABBOTT, *Examiner.*